United States Patent [19]
Robinson

[11] 3,915,017
[45] Oct. 28, 1975

[54] PORTABLE ULTRASONIC RADIOMETER
[75] Inventor: Ronald A. Robinson, Wheaton, Md.
[73] Assignee: The Government of the United States of America, Washington, D.C.
[22] Filed: Aug. 30, 1973
[21] Appl. No.: 393,207

[52] U.S. Cl.................... 73/556; 73/1 DV; 73/70; 177/212
[51] Int. Cl.² ......................................... G01H 3/10
[58] Field of Search ...... 73/1 DV, 69, 70, 556, 557; 177/212; 181/.5 AP

[56] References Cited
UNITED STATES PATENTS

| | | | |
|---|---|---|---|
| 2,052,550 | 9/1936 | Alder | 73/70 X |
| 2,531,844 | 11/1950 | Fiedler | 73/70 X |
| 2,661,622 | 12/1953 | Severs | 73/1 DV X |
| 2,874,794 | 2/1959 | Kiernan | 181/.5 AP |
| 2,939,542 | 6/1960 | Weller et al. | 73/556 |
| 3,092,197 | 6/1963 | Ecker | 177/212 X |
| 3,688,854 | 9/1972 | Strobel | 177/212 X |

Primary Examiner—Richard C. Queisser
Assistant Examiner—Frederick Shoon
Attorney, Agent, or Firm—Browdy and Neimark

[57] ABSTRACT

A portable ultrasonic radiometer, for use as a field survey instrument of ultrasonic therapy equipment, employs the radiation force principle and comprises a solenoid balance arm nulling device. One end of the balance arm includes a movable helical coil which moves inside of a fixed helical coil, and the other end supports an airbacked target. Substantially frictionless rotation of the balance arm is achieved through use of a jewel fulcrum. A reference position of the target is predetermined as the null point, and upon application of the ultrasonic power, deflection of the target occurs. Voltage across the moving coil is used to reposition the target at the null point, and the voltage required is an analogue of the total ultrasonic power. A digital read-out system with manual zeroing capability directly displays this power output.

13 Claims, 7 Drawing Figures

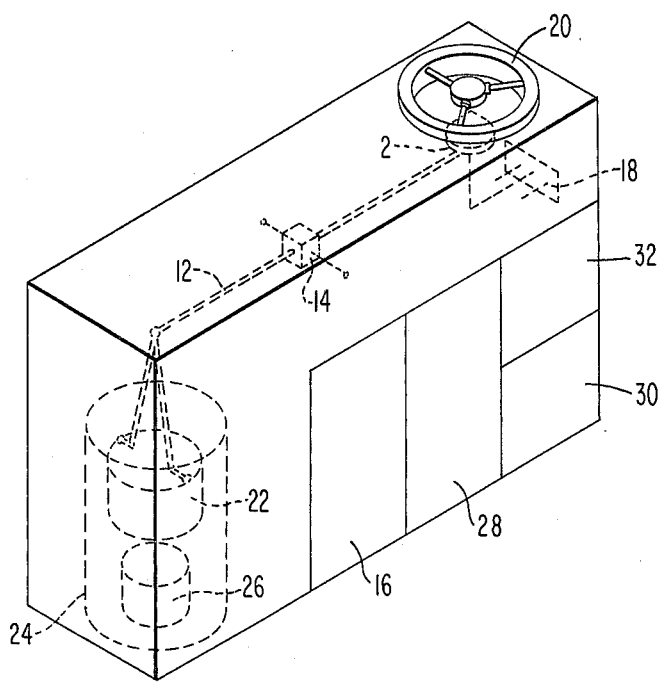
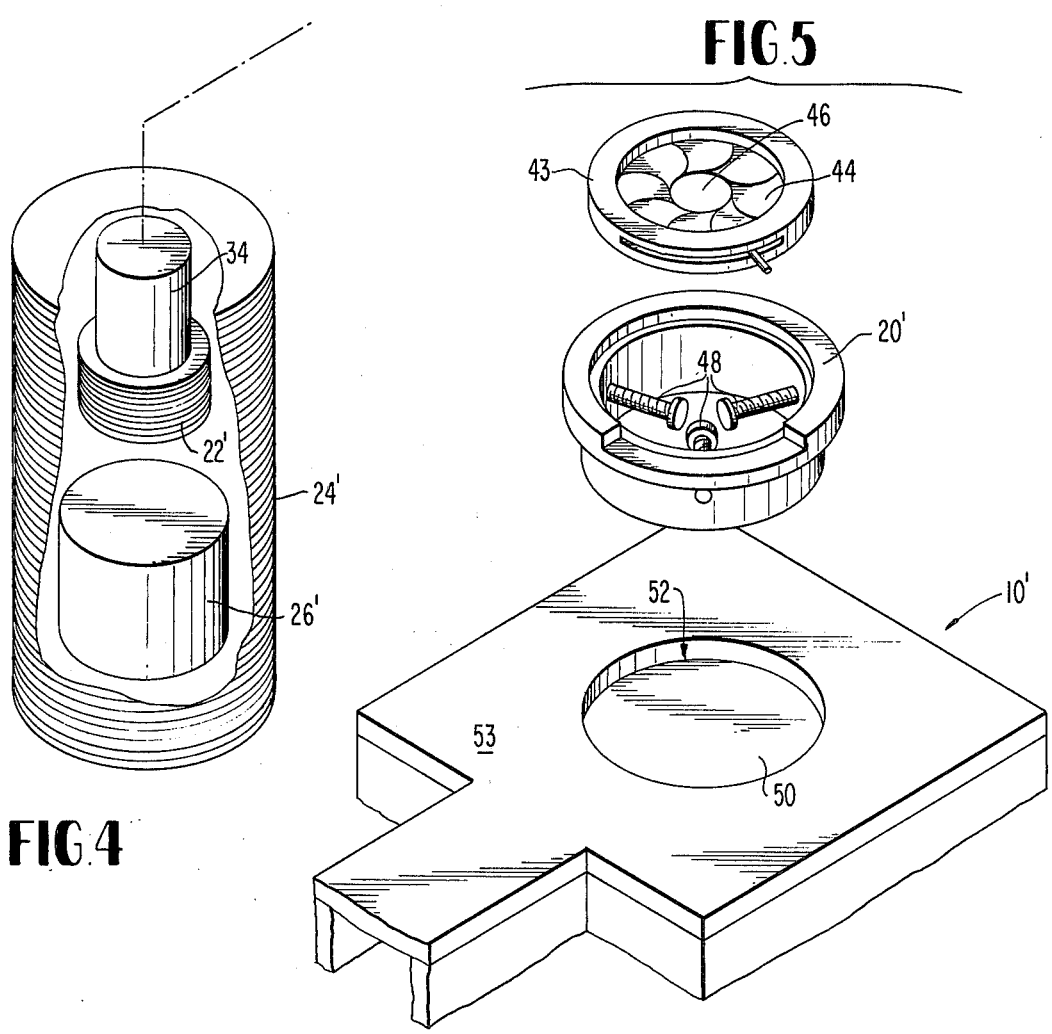

PORTABLE ULTRASONIC RADIOMETER

FIELD OF THE INVENTION

The present invention relates to a device for measuring acoustic or ultrasonic output utilizing the radiation pressure principle with the solenoid balance arm nulling technique and, more particularly, to such a device for monitoring and calibrating ultrasonic equipment.

BACKGROUND OF THE INVENTION

Prior art radiometers, devices used for measuring radiation pressure of sound waves, have utilized a variety of measuring systems such as the chemical microbalance system; radiation pressure float system; the hydrophone technique; and the calorimeter system. The majority of such devices provide, within a container filled with sound conducting liquid, a sound reflecting body disposed within the sound field, the body being movable in the direction of the sound radiation. Displacement of the body is measured and converted to acoustical power.

The sound reflecting body or target in early prior structures usually is a disc suspended on a torsional ribbon within the sound field, perpendicular to sound propagation, which due to radiation pressure will turn about 90°. This rotation is transmitted either mechanically to a pointer forming an indicating element or is made visible by deflection of a light beam. A major disadvantage in usch devices is that the resulting force will not be proportional to radiation pressure in the presence of an increase thereof, because the effective area of the disc hit by the sound waves will decrease with rotation, changing the angle of incidence of the radiation. Also, since the rotation of the disc depends not only on the radiation pressure but also on the point of incidence with respect to the rotational axis, non-homogeneous sound sources, as they are encountered in most cases within the ultrasonic range, cannot be properly compared and measured. A further disadvantage of these early radiometers is that they are limited to measuring sound radiation pressures which are directed horizontally.

In order to overcome these disadvantages later radiometers have utilized a parallelogram linkage mechanism having four rigid arms pivotally connected together with one pivot fixed to the casing of the instrument. One arm of the linkage supports the radiation disc or target which receives the radiation pressure and this arm is restricted by the linkage to move in the direction of radiation so that the target is continually transverse to the direction of radiation. These devices include an indicating element which is moved by the displacement of the disc or target responsive to sound radiation pressure impinging thereon. The major problem with these later radiometers is that they rely on a displacement measurement technique which necessarily introduces extraneous variables, such as the shifting of the point of impingement of radiation pressure and the changing of the angle of incidence thereof. These variables adversely affect and/or limit the sensitivity, range, size, reproducibility, linearity, and read-out mechanisms of such prior art devices.

SUMMARY OF THE INVENTION

The shortcomings of the prior art radiometers which rely on a displacement measurement technique are satisfactorily overcome by the present invention. Thus an object of the present invention is to overcome the defects of the prior art, such as indicated above.

Another object is to provide for improved testing for radiation from ultrasonic equipment.

Another object of the present invention is to provide a simple and yet accurate radiometer.

Another object of the present invention is to provide a substantially linear radiometer.

A further object is to provide a digital read-out system with a manual zeroing capability for directly displaying the acoustic power output.

Yet another object is to provide a radiometer with a wide dynamic operating range.

A still further object is to provide a portable radiometer for calibrating ultrasonic therapy equipment which is capable of measuring total ultrasonic power.

In furtherance of these and other objects, a principal feature of the present invention is a radiometer which utilizes a nulling measurement technique, rather than a displacement measurement technique, to eliminate or minimize the effects of any extraneous variables introduced into the measurement. Another feature of the invention is its provision of a wide dynamic operating range of 100 milliwatts to 100 watts, and its agreement to within 10% of the radiation float method. The advantages of the instant invention over the prior art include portability, ease of measurement; digital read-out; manual zeroing capability; direct linear measurement method; closed system; ease of set-up and comparable accuracy and reproducibility.

The radiometer of the instant invention is characterized by the solenoid balance arm nulling technique which utilizes the force of attraction between two helical coils (one fixed and one moving inside the other) to provide the restoring force or torque on an ultrasonic target attached to the balance arm, when voltage is applied to these two coils. The restoring voltage across the moving coil is an electrical analogue of the ultrasonic power when the instrument is calibrated with known calibrating weights. A nulling read-out technique is employed which provides a differential voltage to null a known calibrating weight. This voltage is displayed on a digital voltmeter and calibrated to read ultrasonic power. A jeweled fulcrum is used to provide near frictionless rotation of the balance arm. Additionally, the target and moving coil are designed to be neutrally buoyant so that almost no initial forces are present on the balance arm.

BRIEF DESCRIPTION OF THE DRAWING

For a better understanding of the invention a possible embodiment thereof will now be described with reference to the attached drawing, it being understood that this embodiment is to be intended as merely exemplary and in no way limitative.

FIG. 2 is a schematic view of one embodiment of a radiometer of the instant invention.

FIG. 4 is a broken-out view showing one embodiment of the fixed and movable coils of the present invention.

FIG. 5 is an exploded view showing one embodiment of the transducer holder of the instant invention.

DETAILED DESCRIPTION

Figure 1:
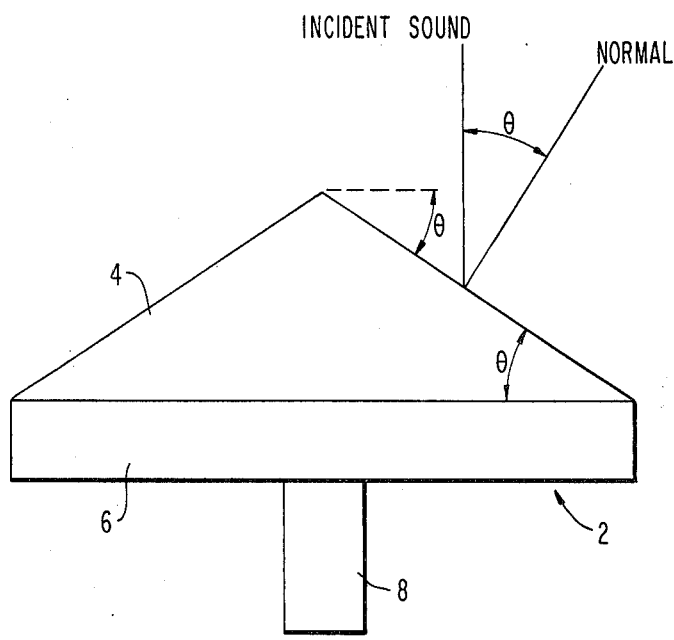
FIG. 1 is an elevational view of a target and its relationship to the angle of incident sound impinging thereon.

Referring to FIG. 1, the radiometer of the instant invention employs the radiation force principle and incorporates a solenoid balance arm nulling technique.

A reflecting target 2 having a base 6 comprises a conical upper portion 4 which forms an angle $\theta$ with the base 6. Elementary geometrical analysis will show that incident sound striking the conical portion 4 perpendicular to base 6 will form a similar angle $\theta$ with a line normal to the surface of conical portion 4. It should be understood that the target body could take on other shapes of configuration besides that of right circular cone shown and described here.

The radiation pressure principle states that ultrasonic radiation exerts force at interfaces between materials having different values of acoustic velocity and density, such as a water air interface. Further, for a totally reflecting ultrasonic target, the radiation force is given by:

$$\frac{F}{P} = \frac{(2\cos^2\theta)(1.02 \times 10^{-3})}{(c)(10^{-7})} = 0.136 \cos^2\theta$$

where
 F = radiation force in grams;
 P = ultrasonic power in watts;
 $\theta$ = angle between the incident ultrasonic beam and the normal to the reflecting surface;
 c = velocity of sound ($1.5 \times 10^{-5}$ cm/sec) for water.

The theory describing the pressure exerted by an ultrasonic beam on a target is described in various tests in ultrasonics (see Wells, P.N.T., Physical Principles of Ultrasonic Diagnosis, Academic Press, New York, N.Y., 1969). The reflecting target 2 of the instant invention which also comprises a cylindrical member 8 extending downward from base 6 (the function of which is to be described hereinafter) affords a calibrating force of 100 milligrams per watt of sonic power.

The solenoid balance arm nulling technique of the instant invention utilizes the force of attraction between two helical coils, one fixed and one moving inside the other, to provide the restoring force or torque on an ultrasonic target attached to a balance arm, when voltage is applied to these two coils. Referring now to FIG. 2, the upper section of a substantially rectangular casing 10 houses the ultrasonic target 2 and balance arm 12. Attached to one end of the balance arm 12 is a movable helical coil 22 which moves inside of a fixed helical coil 24. The airbacked target 2 is attached to the other end of the balance arm 12 and is positioned in the sound field defined by a transducer holder 20.

Essentially frictionless rotation of the balance arm 12 is achieved by using a jeweled fulcrum 14 which is located approximately two-thirds distance from target end of balance arm 12. The balance arm 12 pivots in such a manner that the target 2 attached thereto is movable in the direction of the sound radiation. A predetermined reference position or null point of the target is defined by a nulling indicator 18 which is visible to the operator. This nulling measurement technique is used rather than a displaced measurement technique to eliminate or minimize the effects of any extraneous variables introduced into the measurement.

Upon application of the ultrasonic power, deflection of the target occurs. Two separate D.C. power supplies 16 and 28, each capable of providing 0–20 volts and 0–2 amps, are provided for energizing the movable coil 22 and the fixed coil 24, respectively. Voltage across the moving coil 22 is used to reposition the target at the null point. The restoring voltage across the moving coil 22 is an electrical analogue of the ultrasonic power when the instrument is calibrated with known calibrating weights. This voltage is displayed on a digital volt meter 30 and calibrated to read ultrasonic power. The digital read-out system may be provided with a manual zeroing capability, as described in detail hereinafter. The target 2 and moving coil 22 are designed to be neutrally buoyant so that almost no initial forces are present on the balance arm 12.

All components are located within the casing 10, except for tranducer holder 20 which is mounted in an opening (see FIG. 5) on the upper surface of the casing 10 over the target 2 and is used for holding and positioning the sound emitting transducer of the ultrasonic equipment to be calibrated. The casing 10 may be manufactured out of plastic or suitable metal, although aluminum is preferred because it does not readily warp. The use of lucite or aluminum keeps the weight of the instrument to a minimum. The radiometer is filled with a sound transmitting liquid, such as degassed water, and the opening sealed by a 0.001 inch sound permeable mylar membrane 50 (see FIG. 5). All surfaces of casing 10 are preferably milled flat and sealed with silastic to prevent any water leakage. A control panel 12 may also be located on the casing so as to be readily accessible to the operator.

Since the present radiometer is to be used as a portable field instrument, locking means for securing the blance arm during transport is desirable. Any suitable conventional locking mechanism which is operable in a water tight container and accessible from the exterior thereof may be employed.

The length of the balance arm in the type of jewel movement fulcrum determine the radiometer sensitivity with the nulling indicator defining the limiting factor for optimum sensitivity. Referring now to FIG. 2, an underwater olive jeweled movement utilizing a tungsten carbide pivot (as manufactured by J. D. Worley, Inc., North Falmouth, Massachusetts) may be used as the fulcrum 14'. A thirty centimeter long, 2.5 milimeter in diameter brass balance arm 12' may also be used. It was found that for measurement of acoustic power levels used in ultrasonic therapy, a balance arm length of 30 centimeters was sufficient, with the fulcrum at 10 centimeters and the ultrasonic target 20 centimeters from the fulcrum.

The ultrasonic target 2 is preferably a hollow conically shaped float approximately 10 centimeters in diameter. The target 2 which is designed to be neutrally buoyant comprises a conical upper portion 4 made preferably of 8 mil phosphor-bronze, and a substantially planar base 6 made preferably of copper. As mentioned above, the calibration ratio (mg/W) is determined by the target's angle $\theta$ (see FIG. 1), which is preferably 31° so that the calibration ratio was 100 mg/W. A cylindrical member 8 extends downward from the base 36 of target 16' for receiving one end of the balance arm 12'. A 25 mil wire 40 is attached to the cylindrical member 8 substantially diametrically opposite to and, preferably, in alignment with the balance arm 12'.

The nulling indicator 18' comprises two parallel 25 mil wires 42, 42 attached to a wall 38 of a substantially I-shaped casing 10'. The I-shaped casing may be utilized, instead of the substantially rectangular casing of FIG. 2, when a more compact and lightweight radiometer is desired. By aligning the target carried wire 40 in the plane defined by the two nulling indicator wires 42, 42 a fairly reproducible and parallax-free nulling indicator is provided. It is to be understood that any suitable type of optical light sensing null indicator which will improve sensitivity and ease of operation may be employed. Ideally, the two nulling indicator wires, 42 and 42 would lie in a horizontal plane containing the axis of rotation of fulcrum 14'; however, they can be positioned in other horizontal planes if desired, as shown in FIG. 2. Also, the floor 36 and walls 38, of the section of casing 10' housing the target 2 is preferably lined with a rubber matting to absorb the reflected sound.

Referring now to FIG. 4, the restoring force which nulls the balance arm is provided by the interaction of the magnetic fields set up in fixed coil 24' and moving coil 22' when current is flowing between them. The theory for the force between two coils of this type has been worked out in detail and is used to define the ampere. It has been determined that a current-carrying capacity of 1 ampere at a number of turns of 1100 was needed for fixed coil 24' to provide sufficient restoring force to null a maximum of 100 watts of ultrasonic power. Thus, No. 18 heavy enamel magnet wire may be chosen for winding fixed coil 24' on a normal impact polyvinyl chloride(PVC) coil form machined out of a piece of PVC pipe. The fixed coil 24' is wound on a lathe and 10 close-wound layers were applied. The complete coil is then coated with PVC cement to properly seal the wire for chemical and electrical insulation.

An iron core 26', 7.5 centimeters in diameter and 5 centimeters in height, is waterproofed with epoxy paint and centered in the bottom of fixed coil 24'. The core 26' greatly increases the magnetic flux of the fixed coil 24' and provides a greater restoring force on the moving coil 22' and, thus, the balance arm from which the moving coil 22' is suspended.

The moving coil 22' is designed to be neutrally buoyant. The form is preferably made of normal impact PVC, and No. 24 gauge wire maybe used. The top lid of the coil form is cemented with PVC cement to prevent water leakage and the wire is coated with the same cement. The movable coil 22' may be attached to the balance arm, shown as a broken line, by means of a nylon screw (not shown) in a lucite connector 34. Since the instrument is a sealed water-tight unit, access to the fixed and movable coil wire leads may be accomplished by using copper compression fittings with rubber inserts for sealing the coil wires. A summary of the physical and electrical characteristics of the coils is shown in Table 1.

Table 1

Physical and Electrical Characteristics of Coils

| Parameter | Fixed Coil | Movable Coil |
| --- | --- | --- |
| No. of turns | 1100 | 550 |
| Diameter | 13 cm I.D. | 6 cm O.D. |
| Height | 14 cm | 3 cm |
| Resistance | 7.5 ohms | 9.1 ohms |

*The number of turns for the fixed and movable coil can range from 900 to 1100 turns, and 300 to 550 turns respectively, but the higher number is prefered because the same magnetic restoring force can be obtained with the higher number of turns at a lower current, and therefore lower power dissipation, resulting in minimized temperature effects.

Referring now to FIG. 5, the transducer holder 20' comprises an O-shaped transducer positioner 43 having an iris diaphram 44 which forms a variable aperture 46 and three locking screws 48 which are used to center and hold the transducer. The radiometer is filled with degassed water through an opening 52 in the upper surface 53 of the casing 10'. The opening 52 is sealed by means of a 0.001 inch mylar membrane 50 over which the transducer holder 20' is mounted. Degassed water is poured into that portion of the transducer holder 20' of the sealing membrane 50 when a measurement is to be made so as to immerse the ultrasonic transducer and couple the sound to the target. This water can be siphoned off after the measurement has been performed.

Figure 6:
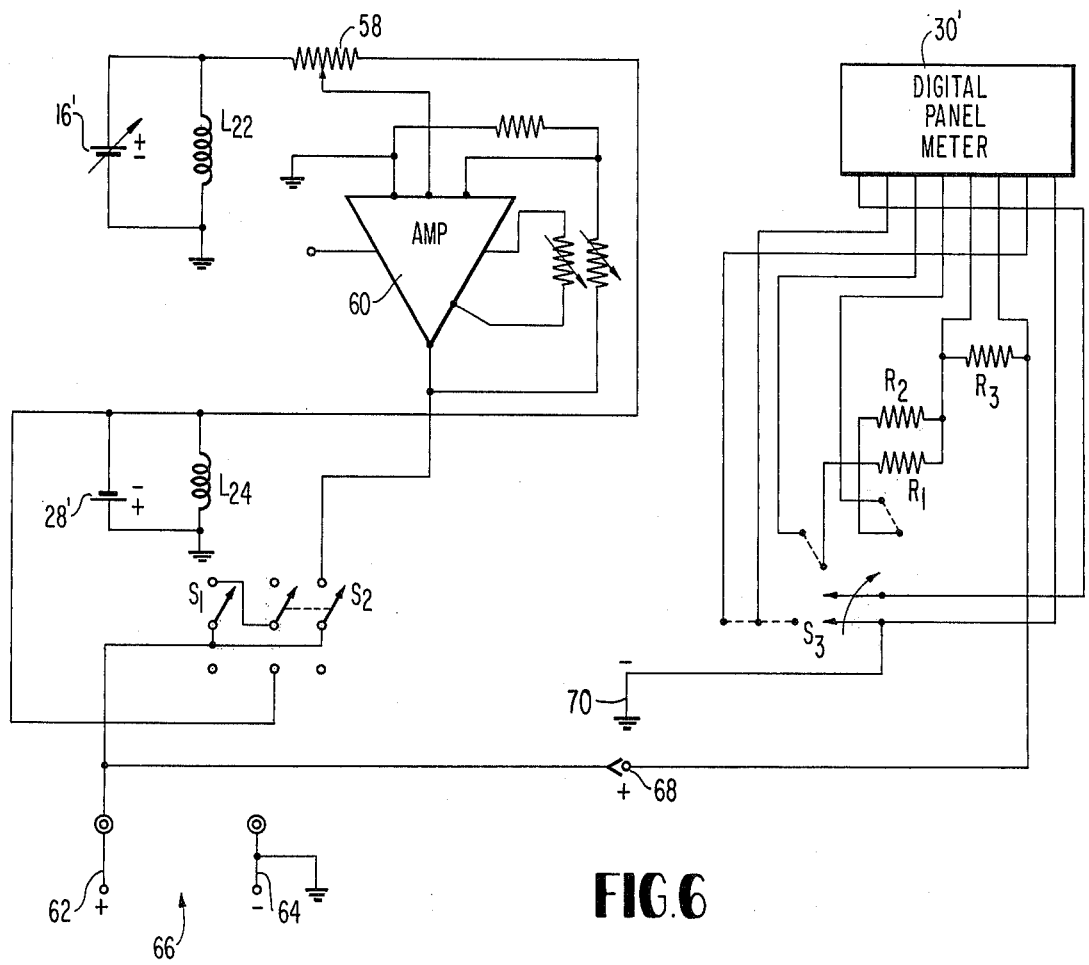
FIG. 6 is a schematic diagram of the electrical circuitry of an embodiment of the present invention.

Referring now to FIG. 6, the variable d.c. supply 16' provides d.c. current and voltage to the moving coil 22. The fixed d.c. supply 28' provides fixed d.c. current and voltage to the fixed coil 24. The magnetic attractive force produced by these two coils when voltage and current are applied is used as the restoring force to offset the ultrasonic radiation force acting on the target body.

Potentiometer 58 provides the proper voltage to offset any voltage necessary to null the target with no ultrasonic power applied. This provides for a direct readout of the measured acoustic or ultrasonic power when it is applied. The amplifier 60 which is connected from potentiometer 58 to digital panel meter positive input 68 and to external input/output 66 by switches $S_1$ and $S_2$ is used as a buffer amplifier to provide for variable gain for digital readout calibration and for proper impedance matching network for any input to output circuitry connected to digital panel meter positive input 68 and to external input/output 66. Single pole, double throw switch S1 and double pole, double throw switch S2 provide for zero calibration checks, fixed voltage check and normal operating mode. These switches would normally be located on the control panel of the radiometer casing (see FIG. 2).

An external input/output 66 comprises a positive terminal 62 and negative terminal 64. Appropriate electrical devices may alternately be connected to external input/output 66 for inserting a fixed calibrating voltage, for zeroing the output display or for providing an external output jack for a digital voltmeter in the event that the digital panel meter 30' should fail. The external input/output 66 is connected to the electrical circuitry associated with the digital panel meter 30', described hereinafter, through positive digital panel meter input 68 and negative input 70.

The circuitry including resistors R1, R2, R3 and switch S3 associated with the digital panel meter 30' provides for the proper scaling and decimal factors. The digital panel meter 30' is connected as a d.c. digital voltmeter and provides for direct readout of ultrasonic power output through a 10 watt/null volt calibration factor.

Since the measured null voltage is directly proportional to the restoring force, the restoring voltage can be used as a read-out of the applied ultrasonic power. With a calibrating ratio of 0.1 volts per watt or 10 watts per volt at 85°F., the digital volt meter, by decimal change, can display ultrasonic power through a switchable scale factors of 2, 20 and 200 watts. It has been observed that a 0.1 volts/watt calibration ratio did not introduce any errors greater than 10% over the normal operating temperature range from 72°–100°F. However, to provide the capability of accurately calibrating the digital volt meter and volts per watt at any water temperature, a calibrating potentiometer may be connected to the input of the buffer amplifier 60, described previously to adjust the input voltage through the meter to comply with the exact calibration ratio.

Referring still to FIG. 6, in operation switches S1 and S2 are set to the zero/calibrate position. External input/output 66 is shorted and the digital panel meter 30' is zeroed. A calibrated 10 volt d.c. voltage is applied to the external input/output 66 and the digital panel meter 30' is calibrated for the proper read-out.

Next, switches S1 and S2 are set to the operating mode and the d.c. power supplies 16' and 28' are turned on. After the power has been turned on, a fixed d.c. voltage of 6.6 volts applied across the fixed coil is checked for. Then the variable d.c. voltage across the moving coil is adjusted for the null position. This is accomplished by visually aligning the null needls 40 on the moving target with the two fixed needles 42, 42 (See FIG. 3), so that all three needles are aligned in a horizontal plane. A voltage will then appear on the digital panel meter 30'. The potentiometer 58 is then adjusted to offset this voltage to make the digital panel meter 30' read zero.

Finally, the ultrasonic applicator or transducer is inserted into the transducer holder and the ultrasonic power is turned on. This results in a deflection of the target. Now the variable d.c. voltage is simply adjusted to bring the target back to the null position. The value displayed on the digital panel meter 30', through a 10 watt/null volt calibration factor, represents the actual measured ultrasonic power output.

The radiometer was first tested using calibration weights to observe its operational characteristics and to note any independent variables. It was demonstrated that a fixed voltage across the coil of 6.6 volts, corresponding to a current Of 900 mamps, was an optimum value at a mid-temperature of 85°F. This corresponded to an even calibration ratio of 0.1 null volts/sonic watts or 10 sonic watts/null volt. The amount of voltage applied to the fixed coil affected the amount of null voltage required on the movable coil to restore the balance arm to the null point for a given calibration weight or equivalent ultrasonic power (100 milligrams/watt). The water temperature also affected the calibration ratio. As the temperature decreased, the calibration ratio decreased and vice versa.

Figure 7:
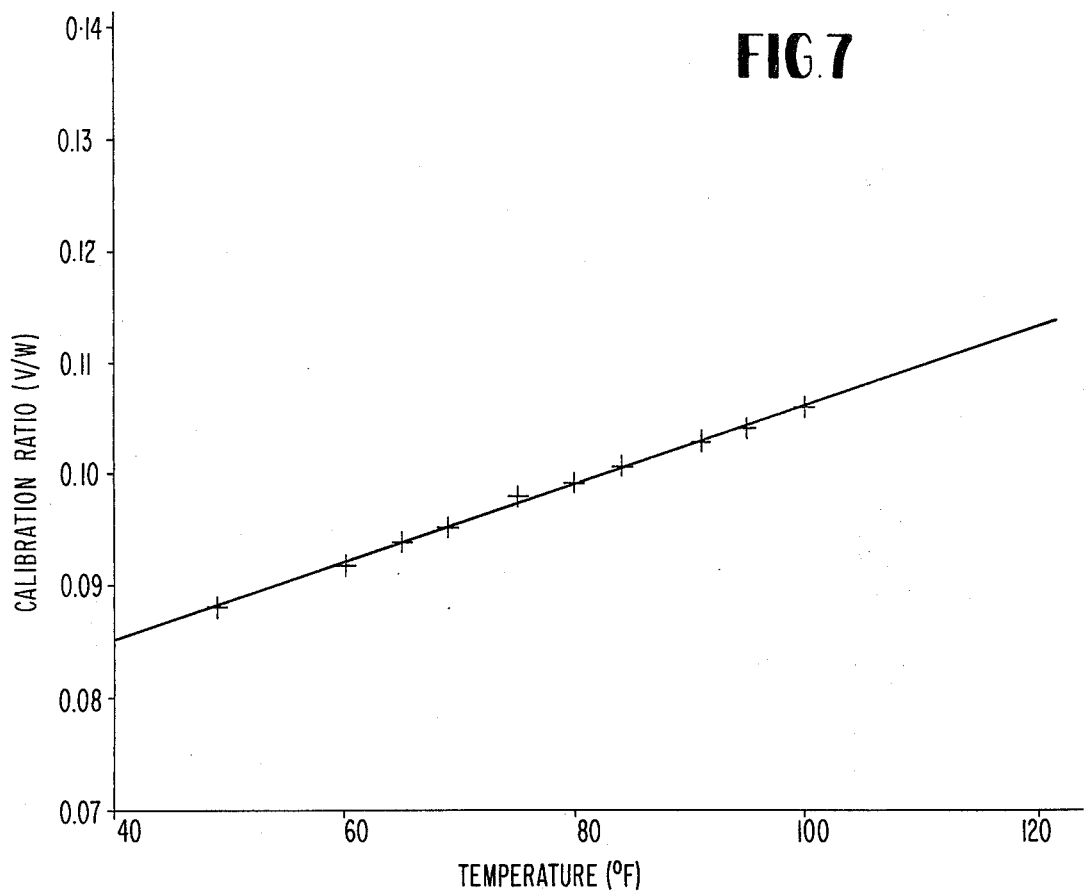
FIG. 7 is a graph showing the effect of temperature variation on calibration ratio.

The reason for this variation has been determined to be primarily due to the change in volume of the PVC moving coil flow which effectively gets heavier (volume decreases) as the temperature gets colder vice versa. PVC has a thermal expansion of four times that of phosphor-bronze, and since its volume is five times greater than the ultrasonic target, its effective weight in water changes more rapidly than the ultrasonic target. The ultrasonic target volume change and the density change of the water at different temperatures also enters into this calibration ratio variation. Data demonstrating this temperature dependence are presented graphically in FIG. 7. It can be seen from FIG. 7 that the calibration ratio varies from 0.088 (null volts per sonic watt) at 49°F. to 0.10 volts per watt at 85°F. to 0.106 volt per watt at 100°F. If one does not compensate for this temperature variation and assumes a calibration ratio of 0.10 null volts per sonic watt, measurement errors will be less than 10% over the operating temperature range of 72° to 100°F. As mentioned above, a potentiometer may be connected to the input of the buffer amplifier 60 to adjust the input voltage to the digital voltmeter to comply with the exact calibration ratio.

The foregoing description of this specific embodiment will so fully reveal the general nature of the invention that others can, by applying current knowledge, readily modify such specific embodiment and/or adopt it for various applications without departing from the generic concept, and, therefore, such adaptations and modifications should and are intended to be comprehended within the meaning and range of equivalence of the disclosed embodiment.

It is to be understood that the phraseology or terminology emplyed herein is for the purposes of description and not of limitation.

What is claimed is:

1. A device for measuring the sound radiation pressure of an acoustical instrument in terms of acoustic power output comprising:

a casing filled with sound transmitting liquid;
   means for transferring sound radiation pressure to the interior of said casing;
   a substantially frictionless fulcrum within said casing;
   a balance arm having a first and second end pivotable about said fulcrum between said ends, wherein said balance arm pivots within said casing in the direction of said sound radiation pressure;
   nulling indicator means for defining a null position, comprising first and second wires attached to the interior of said casing and a third wire attached to said target body, said first and second wires being positioned apart in a plane substantially perpendicular to the direction of sound, wherein when said target body is in said null position all of said wires lie in said plane;
   a target body secured to said first end of said balance arm and located within said casing opposite said transferring means, said target body being positioned at said null position when not contacted by any sound radiation pressure and being pivotably displaced away from said null position when contacted by said sound radiation pressure;
   means for producing a restoring force, said restoring force being applied to said balance arm to null said displacement of said target body, wherein said target body is returned to said null position; and
   read-out means connected to said force producing means for indicating said restoring force.

2. The device of claim 1 wherein said target body is a right circular cone.

3. The device of claim 2 wherein said target body is hollow.

4. The device of claim 2 wherein the diameter of said right circular cone is substantially greater than the height.

5. The device of claim 1 wherein said means for producing a restoring force comprises a first coil forming a chamber fixedly positioned within said casing; a second coil attached to said balance arm between said second end and said fulcrum and movable within said chamber of said first coil; and means for applying first and second voltages to said first and second coils, respectively, such that magnetic fields are set up therein; wherein the interaction of said magnetic fields produces said restoring force and said second voltage is an analogue of the total acoustic power output of the instrument.

6. The device of claim 5 wherein said second coil is attached to said second end of said balance arm.

7. The device of claim 5 wherein said second coil is buoyant.

8. The device of claim 5 wherein said voltage means comprises a first and second d.c. supply for producing said first and second voltages, respectively, wherein said second d.c. supply is variable.

9. The device of claim 1 wherein said read-out means comprises a digital panel meter for converting said restoring force to a digital acoustic power reading and for visually displaying said digital acoustic power reading.

10. The device of claim 1 wherein said sound transferring means comprises an aperture in said casing and a sound permeable membrane for sealing said aperture after said casing is filled with said sound transmitting liquid.

11. The device of claim 1 wherein said target body is buoyant.

12. The device of claim 1 wherein said target body is hollow.

13. A device for measuring the sound radiation pressure of an acoustical instrument in terms of acoustic power output comprising:
   a casing filled with sound transmitting liquid;
   means for transferring sound radiation pressure to the interior of said casing;
   a substantially frictionless fulcrum within said casing;
   a balance arm having a first and second end pivotable about said fulcrum between said ends, wherein said balance arm pivots within said casing in the direction of said sound radiation pressure;
   nulling indicator means for defining a null position;
   a target body secured to said first end of said balance arm and located within said casing opposite said transferring means, said target body being positioned at said null position when not contacted by any sound radiation pressure and being pivotably displaced away from said null position when contacted by said sound radiation pressure;
   a first coil forming a chamber fixedly positioned within said casing;
   a second coil attached to said balance arm between said second end and said fulcrum and movable within said chambers of said first coil;
   means for applying first and second voltages to said first and second coils, respectively, such that magnetic fields are set up therein; wherein the interaction of said magnetic fields produces a restoring force applied to said balance arm through said second coil to return said target body to said null position; and
   read-out means connected to said first and second coils for indicating said restoring force.

* * * * *

UNITED STATES PATENT OFFICE
CERTIFICATE OF CORRECTION

PATENT NO. : 3,915,017
DATED : October 28, 1975
INVENTOR(S) : Ronald A. ROBINSON It is certified that error appears in the above-identified patent and that said Letters Patent are hereby corrected as shown below:

Column 3, line 35, this line should read:

--$c$ = velocity of sound ($1.5 \times 10^{+5} cm/sec$) for water.--

Figure 3:
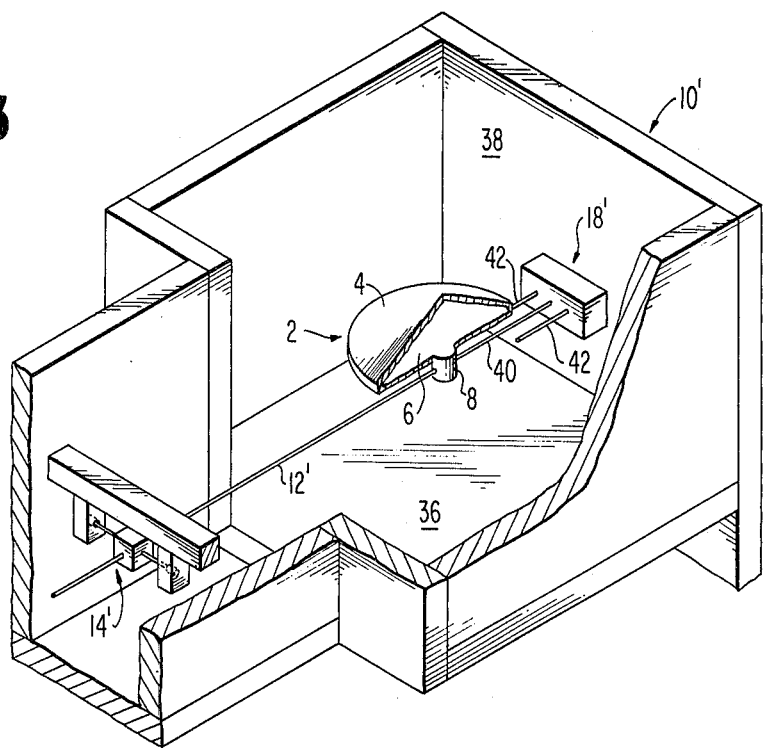
FIG. 3 is a broken-out view showing one embodiment of the balance arm fulcrum and target arrangement of the instant invention.

Column 4, line 46, "FIG. 2" should read --FIG. 3--

Signed and Sealed this twenty-fourth Day of February 1976

[SEAL]

Attest:

RUTH C. MASON
*Attesting Officer*

C. MARSHALL DANN
*Commissioner of Patents and Trademarks*